United States Patent
Mason et al.

(10) Patent No.: US 8,145,717 B2
(45) Date of Patent: Mar. 27, 2012

(54) SYSTEM AND METHOD FOR PROVIDING PRESENCE AGE INFORMATION IN A UNIFIED COMMUNICATION SYSTEM

(75) Inventors: Andrew Mason, Sunnyvale, CA (US); Victor Chan, Saratoga, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 909 days.

(21) Appl. No.: 11/232,474

(22) Filed: Sep. 21, 2005

(65) Prior Publication Data

US 2007/0067439 A1   Mar. 22, 2007

(51) Int. Cl.
*G06F 15/16* (2006.01)
(52) U.S. Cl. ......... 709/206; 709/204; 709/205; 709/207
(58) Field of Classification Search .................. 709/204, 709/205, 206, 207
See application file for complete search history.

(56) References Cited

U.S. PATENT DOCUMENTS

| | | | |
|---|---|---|---|
| 2002/0129103 A1 | 9/2002 | Birkler et al. | |
| 2003/0083046 A1 | 5/2003 | Mathis | |
| 2003/0217142 A1* | 11/2003 | Bobde et al. | 709/224 |
| 2003/0220976 A1* | 11/2003 | Malik | 709/206 |
| 2004/0059781 A1* | 3/2004 | Yoakum et al. | 709/204 |
| 2005/0071435 A1* | 3/2005 | Karstens | 709/207 |

OTHER PUBLICATIONS

PCT ISR Jun. 12, 2006.

* cited by examiner

*Primary Examiner* — Karen Tang
*Assistant Examiner* — Cheikh Ndiaye

(57) ABSTRACT

A telecommunications system includes a network; a plurality of client devices operably coupled to said network, said plurality of client devices adapted to set one or more time contact parameters for buddies on a contact list; and a presence server including a timer, and adapted to maintain a timing of time contacts for selected contacts responsive to said parameters.

20 Claims, 6 Drawing Sheets

| 402<br>My Contacts | 404<br>Last Contact Media | 406<br>Last Contact Information | |
|---|---|---|---|
| Bob Smith | Email | 3 days, 4 hrs., 26 min., 37 sec. | 408 |
| Samantha Williams | Telephone | [Date: - / - / -] | 409 |
| Gian Luigi | IM | ☺ | 410 |
| Winter Green | Collah. | ☺ | 412 |

|  702  | 704 | 706 |
|---|---|---|
| Contact | Select Threshold | Select Action |
|  | None | Notify |
|  | 30 | Recycle |
|  | 60 |  |
|  | 90 |  |
FIG. 7
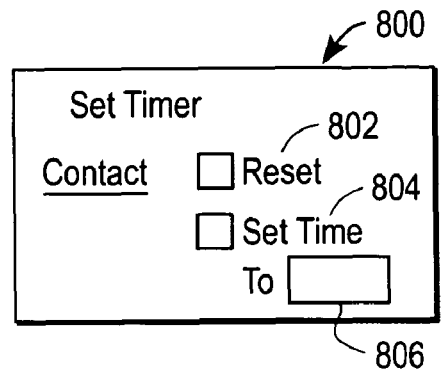
FIG. 8
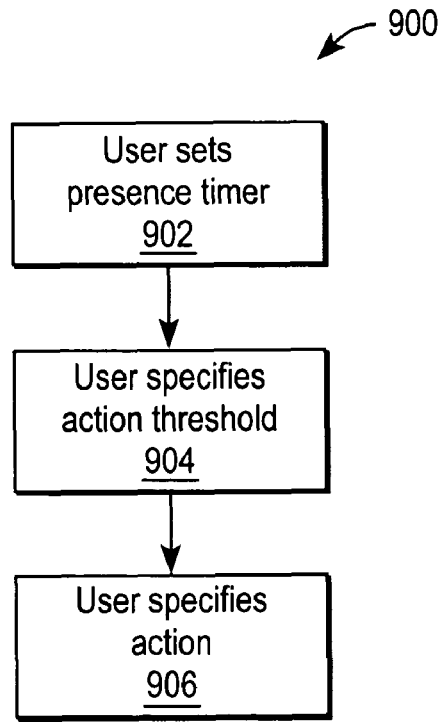
FIG. 9
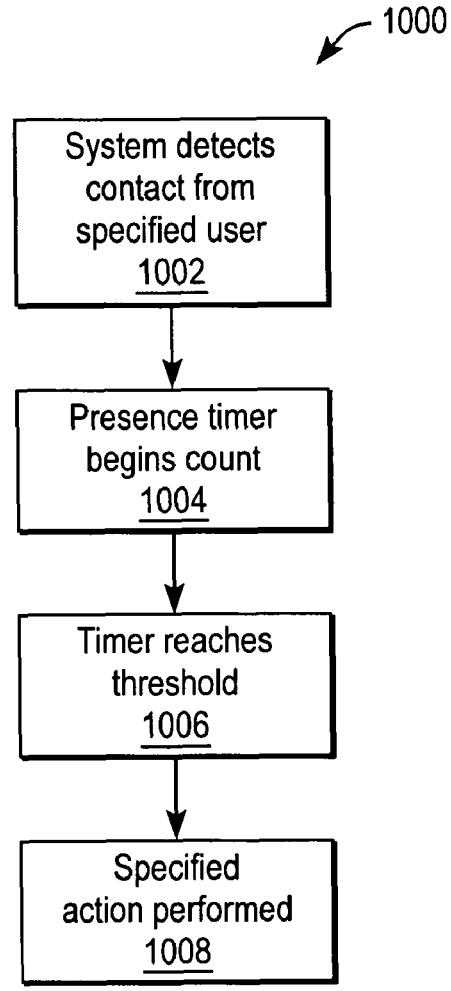
FIG. 10

SYSTEM AND METHOD FOR PROVIDING PRESENCE AGE INFORMATION IN A UNIFIED COMMUNICATION SYSTEM

BACKGROUND OF THE INVENTION

1. Field of the Invention

The present invention is directed generally to telecommunications systems and, particularly, to improvements in providing presence information.

2. Description of the Related Art

Presence-based communications applications are entering the mainstream telecommunications environment. In such applications, a user maintains one or more "contact lists" of other parties whose presence status is to be monitored and displayed to the user. If the other party is determined to be "present," the user's contact list will display the available status. The user can then contact the other party.

Often, however, the management of contact lists can become cumbersome, particularly to the inexperienced or casual user. For example, over a period of time, a user may continually add "buddies" or contacts to the contact list, while neglecting to remove or update "stale" buddies, i.e., those who have not been contacted in a while. When this happens, the number of "active" buddies on the list can be overwhelmed by the number of stale buddies. In this case, it can become difficult to identify useful contact information.

SUMMARY OF THE INVENTION

These and other drawbacks in the prior art are overcome in large part by a system and method according to embodiments of the present invention.

A telecommunications system according to an embodiment of the present invention includes a network; a plurality of client devices operably coupled to said network, said plurality of client devices adapted to set one or more time contact parameters for buddies on a contact list; and a presence server including a timer, and adapted to maintain a timing of time contacts for selected buddies responsive to said parameters.

A telecommunication system according to embodiments of the present invention allows a user to determine an age of a party on the user's contact list. The "age" may be the amount of time since the user had any contact with the party. In addition, the user may be able to set a timer to such that, if the age of the party exceeds the timer threshold, the system may remind the user to "refresh" the contact, i.e., attempt to re-initiate contact or update the contact information.

A telecommunications presence system according to an embodiment of the present invention includes a network; a plurality of network clients coupled to the network, said network clients including presence control units configured to maintain contact lists of other clients whose presence status is to be monitored; a presence server coupled to the network, said presence server including a master presence control unit adapted to receive said contact lists and configured to monitor presence status across a plurality of media and distribute presence information to corresponding ones of said plurality of network clients; wherein said presence server maintains presence status age information.

A telecommunications system according to embodiments of the present invention is adapted to maintain presence information across a plurality of media including, for example, messaging, real-time voice and video, and conferencing. The system further allows users to set age monitoring for parties on the user's contact list(s). The age monitoring may be specific to the user, to other parties, or to media, or all three.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 7 is a diagram of a graphical user interfaces according to embodiments of the present invention.

FIG. 8 is a diagram of a graphical user interfaces according to embodiments of the present invention.

FIG. 9 is a flowchart illustrating operation of embodiments of the present invention.

FIG. 10 is a flowchart illustrating operation of embodiments of the present invention.

DETAILED DESCRIPTION OF EMBODIMENTS OF THE INVENTION

Figure 1:
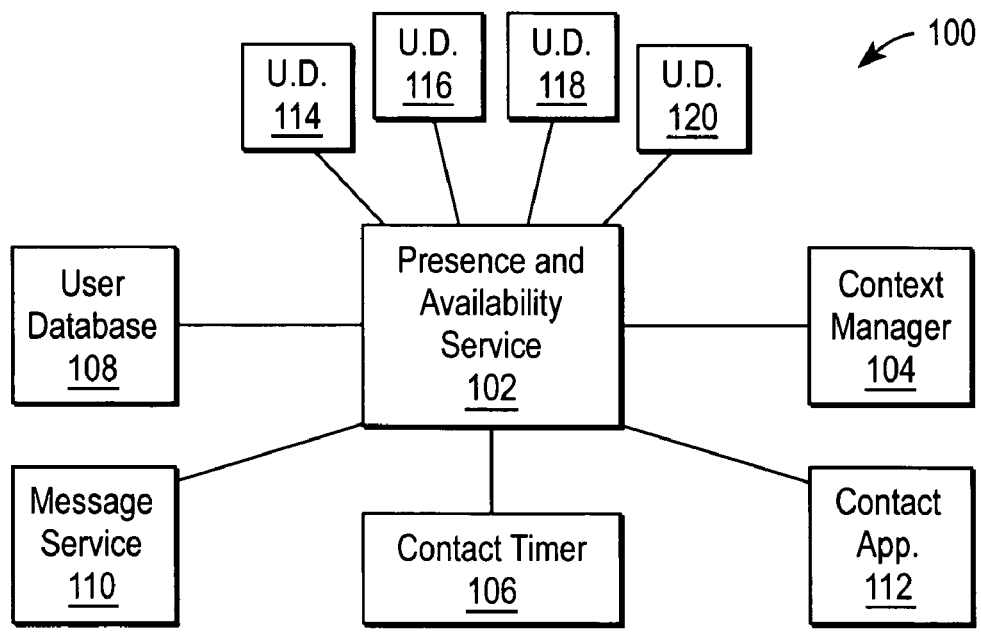
FIG. 1 illustrates a multi-modal presence system according to embodiments of the present invention.

Turning now to the drawings and, with particular attention to FIG. 1, a diagram schematically illustrating a telecommunications system 100 according to an embodiment of the present invention is shown. In some embodiments, the system 100 includes a presence and availability service 102 (also referred to as a master presence control unit) operably coupled to or in communication with a context or contact manager 104, a contact timer 106, and a user database 108. The system 100 may also include a messaging service 110 and a contact application 112 operably coupled to or in communication with the presence and availability service 102.

User devices, such as the user devices 114, 116, 118, 120 may be operably coupled to or in communication with the presence and availability service 102. In some embodiments, a user device may be or include such things as telephones, cellular telephones, PDAs, computers, etc. For example, the user devices 114, 116, 118. 120 may be personal computers implementing the Windows XP™ operating system, a web browser, such as Microsoft Explorer, and the Windows Messenger™ instant messenger system. In addition, the user devices 114, 116, 118, 120 may include telephony and other multimedia messaging capability using, for example, peripheral cameras, Webcams, microphones and speakers (not shown) or peripheral telephony handsets, such as the Optipoint™ handset available from Siemens Information and Communication Networks.

In some embodiments, the system 100 may include other hardware and/or software components (e.g., gateways, proxy servers, registration servers, presence servers, redirect servers, databases, applications), such as, for example, hardware and software used to support a SIP or other protocol based infrastructure for the system 100 and allow registration of SIP devices in the system 100.

In some embodiments, the context manager 104 may receive information regarding a device or application associated with a user, such as calendar information, schedule information, location information, configuration information, context information, contact media, etc. In some embodiments, the contact manager 104 may provide the information to one or more applications upon request, periodically, or in response to some other plan or procedure.

The context manager 104 may be implemented in hardware and/or software operating on one or more servers, computer systems, host or mainframe computers, workstations, etc. In some embodiments the context manager 104 may be operating on some or all of the same device(s) as other components in the system 100.

The contact application 112 may be or include an application such as a presence control unit that uses, collects, refers to, etc. information regarding one or more users and associated contacts and/or contact media. In some embodiments, a user device, server, host or mainframe computer, workstation, etc. may include a contact application or have one operating or residing on it. As will be explained in greater detail below, one or more contact applications 112 may be used to set, send, and receive contact timer information. The contact application 112 may be implemented in hardware and/or software operating on one or more servers, computer systems, host or mainframe computers, workstations, etc. In some embodiments the contact application 112 may be operating on some or all of the same device(s) as other components in the system 100.

The user database 108 may store user contact lists and other user information that may be accessed by other system components. In some embodiments the user database 108 may be operating on some or all of the same device(s) as other components in the system 100.

The presence and availability service 106 may be or include an application that monitors the presence and availability of devices. The presence and availability service 106 may be implemented in software operating on one or more servers, computer systems, host or mainframe computers, workstations, etc. In some embodiments the presence and availability service 106 may be operating on some or all of the same device(s) as other components in the system 100.

In some embodiments, the presence and availability service 106 may be or include an application that communicates with or is connected to one or more registered devices (e.g., devices 114, 116, 118, 120), that allows devices to register with the system 100 or helps facilitate their registration, etc. For example, in a SIP environment, the devices 114, 116, 118, 120 may be registered with the system 100 and may show up or be described in registration databases as being assigned to particular identities. The context manager 104 may register with the presence and availability service 106 and receive device context and/or other information from the presence and availability service regarding the devices 114, 116, 118, 120.

In some embodiments, the presence and availability service 106 may provide context information to the contact manager 104 upon request, periodically, or in accordance with some other plan or procedure. The context manager 104 can monitor when the status of a particular user has changed and, in particular, when that user has contacted another party. It is noted that contact or application events or changes in status that can be monitored can include, for example, a last messaging such as e-mail exchange, or a calendar event, such as a meeting or conference. The context manager 104 can then activate the contact timer 106 to begin timing or counting when that occurs; alternatively, the context manager can communicate with the contact application 112 to cause the timing. If the timing reaches a predetermined threshold, then the context manager 104 can notify an associated user or perform another action.

Figure 2:
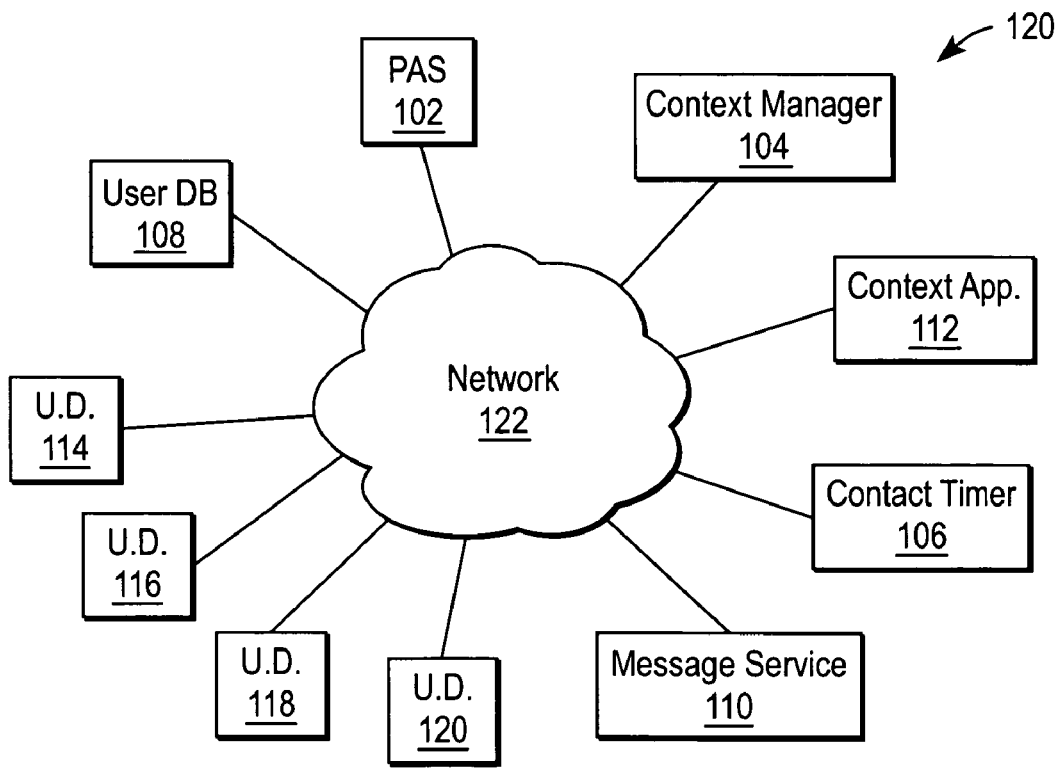
FIG. 2 is a block diagram of a telecommunications system according to an embodiment of the present invention.

In some embodiments, one or more of the components of the system 100 may be connected or in communication with each other via a communication network. For example, now referring to FIG. 2, a system 120 including the components of the system 100 is illustrated, wherein some or all of the components are in communication via a network 122. The network 122 may be or include the Internet, the World Wide Web, a local area network, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 122 may be implemented using a TCP/IP network and may implement voice or multimedia over IP using, for example, the Session Initiation Protocol (SIP).

The contact age determination system in accordance with embodiments of the present invention may be implemented in conjunction with a multi-modal telecommunications system.

Figures 3, 4:
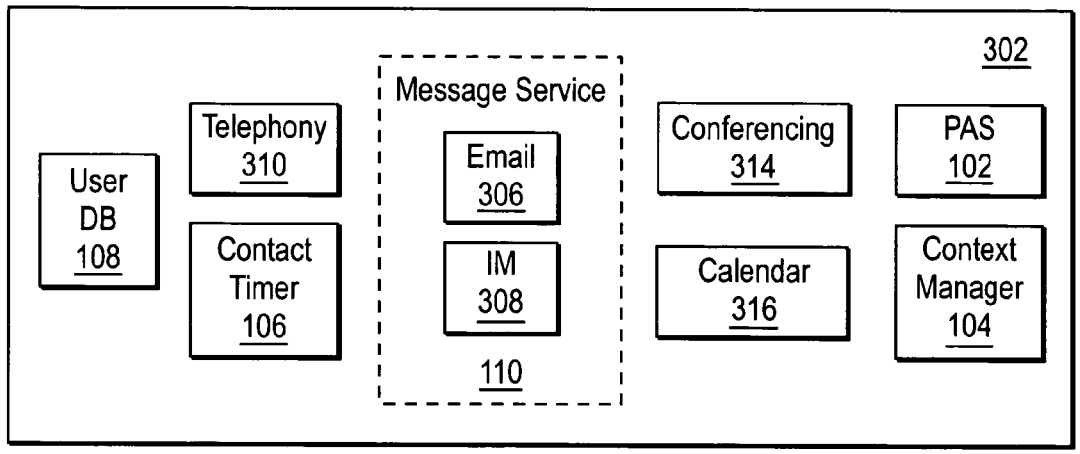
FIG. 3 is a block diagram of a multimedia server according to embodiments of the present invention.
FIG. 4 is a diagram of a graphical user interfaces according to embodiments of the present invention.

FIG. 3 is a block diagram illustrating various components of a multimodal telecommunications system that may be operably coupled to or in communication with the age determination system of embodiments of the present invention, e.g., the contact manager 104, user database 108, contact timer 106, and messaging service 110. The multi-modal system may include a telephony service 310, conferencing service 314, and calendar service 316. The multi-modal system may be implemented as a presence server with functions accessible to user devices employing web portals or browsers. The multi-modal system may be implemented as a suitably programmed computer or workstation capable of high volume transaction processing, performing a significant number of mathematical calculations in processing communications and database searches. A Pentium™ microprocessor such as the Pentium III™ or IV™ microprocessor, manufactured by Intel Corporation may be used for the processor of such a computer or workstation. Other suitable processors may be available from Motorola, Inc., AMD, or Sun Microsystems, Inc. The processor also may be embodied as one or more microprocessors, computers, computer systems, etc.

The messaging service 110 may be or include any of a variety of messaging services, such as e-mail 306, instant messaging 308, and the like. Other messaging includes, for example, browser pop-up notification, short message service (SMS), etc.

The telephony service 310 provides telephony capabilities to user devices. The conferencing service 314 allows users to engage in conferences, providing any needed switching and/or mixing functions. The calendar 316 allows users to set up calendar to-do lists, and the like, specifying meetings and conferences, etc., with other users or workgroup members.

In addition, a multi-modal presence feature or master presence control unit 102 can provide presence services, including age information, aggregated across the various media 110, 310, 314, 316. More particularly, as will be explained in greater detail below, the presence system 102 can monitor one or more user contact lists and applications for specified presence or availability. That is, the presence and availability service 102 will monitor for an event associated with an application or media, such as a calendar application or a messaging application, that is deemed a contact. In addition, the presence system 102 operates in conjunction with the contact manager 104 to maintain one or more timers 312 to determine a time since a party on the contact list was last available or was last contacted, typically across all media. As will be explained in greater detail below, users can actively manage their contact lists based on the presence age/time contact information. In particular, in certain embodiments, an "aged" buddy will cause a reminder to issue to the user; the user can then reinitiate contact with the buddy.

It is noted that while illustrated as a multi-modal presence system, the teachings of the present invention are equally applicable to other telecommunications systems. Thus, the figures are exemplary only. An exemplary multi-modal telecommunications system that may be provided with contact age determination capabilities in accordance with embodiments of the present invention is the OpenScape system, available from Siemens Information and Communication Networks, Inc. Such an environment can be implemented, for example, in conjunction with Windows Server, Microsoft Office Live Communications Server, Microsoft Active Directory, Microsoft Exchange and SQL Server.

As noted above, an aging contact system in accordance with embodiments of the present invention allows a user to determine an age of a contact on his contact list(s), and perform actions thereon. An exemplary user interface illustrating one example of a contact application 112 and/or user portal browser is shown in FIG. 4. In particular, FIG. 4 illustrates a list of contacts 402, a last contact media 404, and last contact information 406. It is noted that such an interface is exemplary only; depending on the embodiment various features illustrated, such as last contact media, for example, may or may not be present or shown.

The contacts list 402 lists the users contacts. In the example illustrated, four contacts are present: Bob Smith, Samantha Williams, Gian Luigi, and Winter Green. The Last Contact Media column 404 lists the media by which the associated party last contacted the user. Thus, as shown, Bob Smith last contacted the user via e-mail; Samantha Williams last contacted the user via telephone; Gian Luigi last contacted the user via IM; and Winter Green last had a collaboration session.

Finally, the last contact information column 406 illustrates various ways in which contact aging can be displayed. At 408, contact aging can be illustrated using a days, hours, minutes, seconds since last contact format. At 409, aging can be illustrated using a date (and time) of last contact format. At 410, aging can be illustrated using one or ore icons; as shown, a "smiley face" icon is displayed, showing that the contact was last made within a predetermined period of recentness. At 412, aging can be shown by "aging" the icon, e.g., via white hair and beard, to show the contact was last made past a threshold of recentness.

Figures 5, 6:
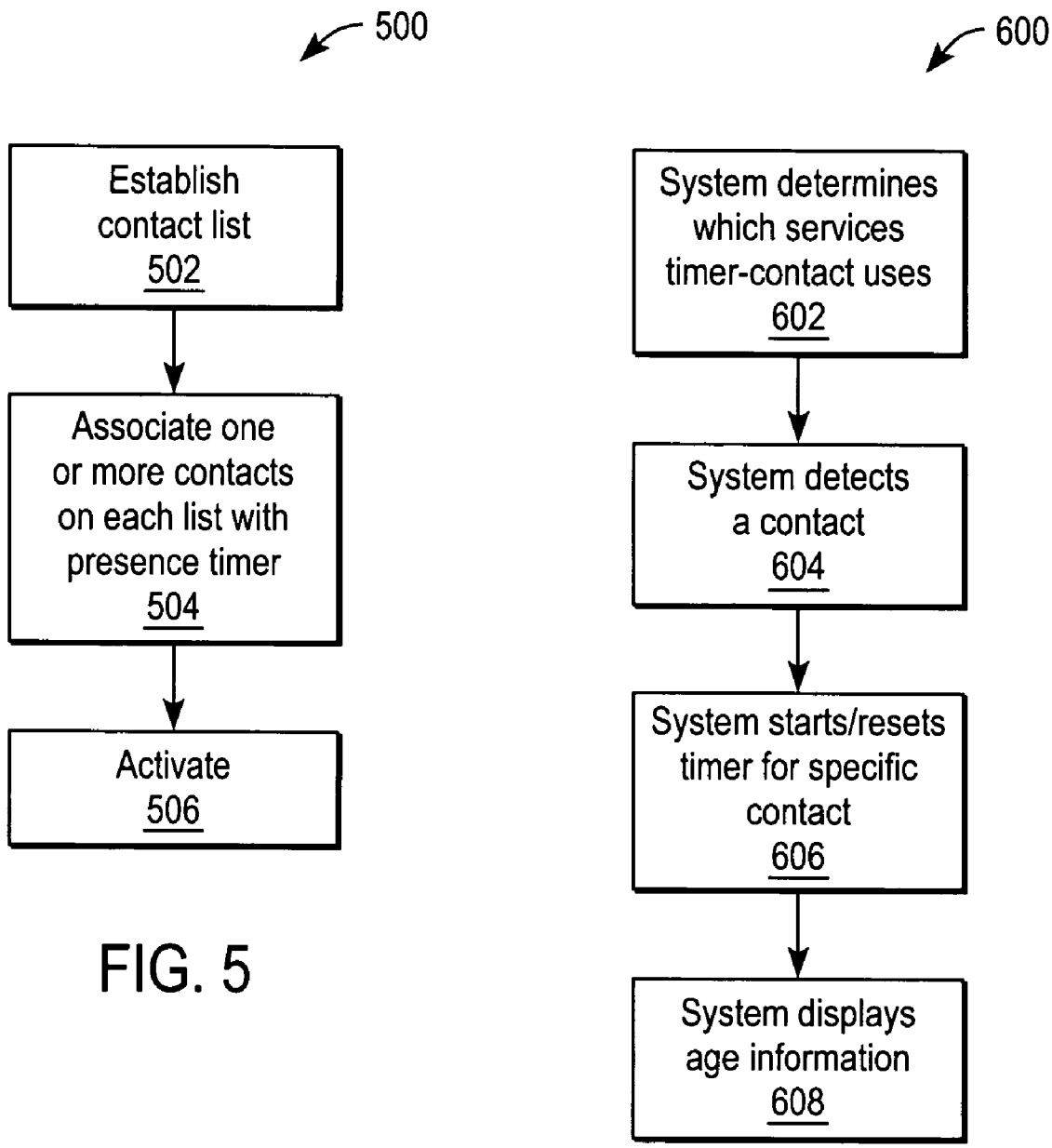
FIG. 5 is a flowchart illustrating operation of embodiments of the present invention.
FIG. 6 is a flowchart illustrating operation of embodiments of the present invention.

Turning now to FIG. 5, a flowchart 500 illustrating operation of an embodiment of the present invention is shown. The particular arrangement of elements in the flowchart 500 is not meant to imply a fixed order to the elements; embodiments can be practiced in any order that is practicable.

At a step 502, a user can establish a contact list using, e.g., a contact application 112 and web browser at a user device in communication with the contact manager 104 and presence and availability service 102. At a step 504, the user can associate one or more contacts on the list with the presence timer 504. That is, the user can select which (or all) of its contacts should be timed. For example, the contact timer 106 and/or one or more contact applications 112 may be suitably programmed to allow user selection of contacts for timing. Finally, at a step 506, the user can activate the timing function.

Turning now to FIG. 6, a flowchart 600 illustrating operation of an embodiment of the present invention is shown. The particular arrangement of elements in the flowchart 600 is not meant to imply a fixed order to the elements; embodiments can be practiced in any order that is practicable.

In a step 602, the system, for example, the presence and availability service 102, the context manager 104, or a suitable contact application 112, determines which services (e.g., messaging, communication, or calendaring) the contact to be timed uses. At a step 604, the system can detect a contact with the user. Such determination can, for example, be made by determining if the user has called the contact telephone number (or vice versa), sent or received an e-mail, Instant message, SMS, and the like with the contact. In general, the presence and availability service 102 detects a contact and provides this information to the contact manager 104. In addition, in some embodiments, a contact can be associated with a calendar event, such as a meeting or conference. In response to detecting a contact, the system and, particularly, in certain embodiments, the contact manager 104, will start and/or reset the associated contact timer 106, in a step 606. Finally, in a step 608, the system will display the contact age information based on the last detected contact.

In addition to setting user status, the user can also set time contact parameters such as age thresholds to associate with other parties. That is, the user can set an age threshold for another party, and associate it with one or more (or all) media. The timer 106 will then count to (or down from) the threshold if no change in presence status is detected thereafter. If the timer expires, then the server or local client software can take one or more actions in response. For example, the system will monitor for any contact with the party. If the timer expires without contact, then the system can generate a reminder (e.g., a pop up window or other message sent via the messaging system 110) to the user to refresh the contact (e.g., re-initiate contact with the party or otherwise update the contact list).

FIG. 7 illustrates an exemplary time contact parameter (age) setting window according to embodiments of the present invention. The age setting window 700 may be accessible via, for example, the portal 400. In the embodiment illustrated, the age setting window 700 includes contact 702, threshold 704, and action 706 options. In operation, the user can select a contact 702 and associate a threshold 704 with the contact. The settings may be received by the contact application 112. The presence and availability service 102 and the context manager 104 then monitor the presence status and can clear, activate, or read the timer 106 of the party selected. In the example illustrated, the user can set no threshold, or thresholds of 30, 60, and 90 days. Other time setting options may be available; thus the figures are exemplary only.

Further, as shown in FIG. 8, the user can set or reset an age timer specific to an individual party, or all parties on his contact list. In particular, FIG. 8 illustrates an exemplary interface that allows the user to reset the timer or set it to a desired time. Again, inputs to the interface 800 are received at the appropriate contact application 112 and communicated to contact manager and/or presence and availability service to coordinate timer activities. In particular, once the user has selected a corresponding party in the contact list, he can select RESET 802 to reset the timer. Similarly, the user can select SET TIME 804 and enter a particular time in window 806 to set a particular timer setting. In certain embodiments, the user can also elect to reset all timers associated with all contacts.

Turning now to FIG. 9, a flowchart 900 illustrating operation of an embodiment of the present invention is shown. The particular arrangement of elements in the flowchart 900 is not meant to imply a fixed order to the elements; embodiments can be practiced in any order that is practicable.

In a step 902, the user can set the presence timer 106. At a step 904, the user can set or specify an action threshold, for example, using the interface of FIG. 7. Thus, the user can set an age of "no contact" for an associated contact. Finally, in a step 906, the user can specify the action which is to be taken when the timer expires. In certain embodiments, the action can be a notification of an aging of the contact; or a deleting of the contact from the contact list. In other embodiments, the action could be initiating a contact with an aged buddy.

Turning now to FIG. 10, a flowchart 1000 illustrating operation of an embodiment of the present invention is shown. The particular arrangement of elements in the flowchart 1000 is not meant to imply a fixed order to the elements; embodiments can be practiced in any order that is practicable.

In a step 1002, the system detects a contact from a specified user. For example, the presence and availability service 102 can detect a change in a status of a user who has been selected to be monitored and the party who is monitoring the user. Typically, the status is a contact of the user with the party doing the monitoring. In a step 1004, the presence timer 312 begins a count, i.e., begins timing the period from the contact. In a step 1006, the presence timer 106 reaches the threshold. In a step 1008, the contact manager causes the specified action to be performed.

As noted above, in certain embodiments, the user may be advised of the "aged" status of a particular contact and given the option of deleting the aged contact from the user's contact list. Alternatively, or in addition, the user can be given the option of contacting the "aged" buddy using, for example, e-mail or other messaging application. This is illustrated schematically and by way of example in FIG. 11. Shown are a user device 114, a server 302, and an exemplary browser window 1100. The browser window may be generated on the browser running at the user device 1100 in response to commands from the server 302 responsive to detection of an expired timer associated with a particular contact.

Figure 11:
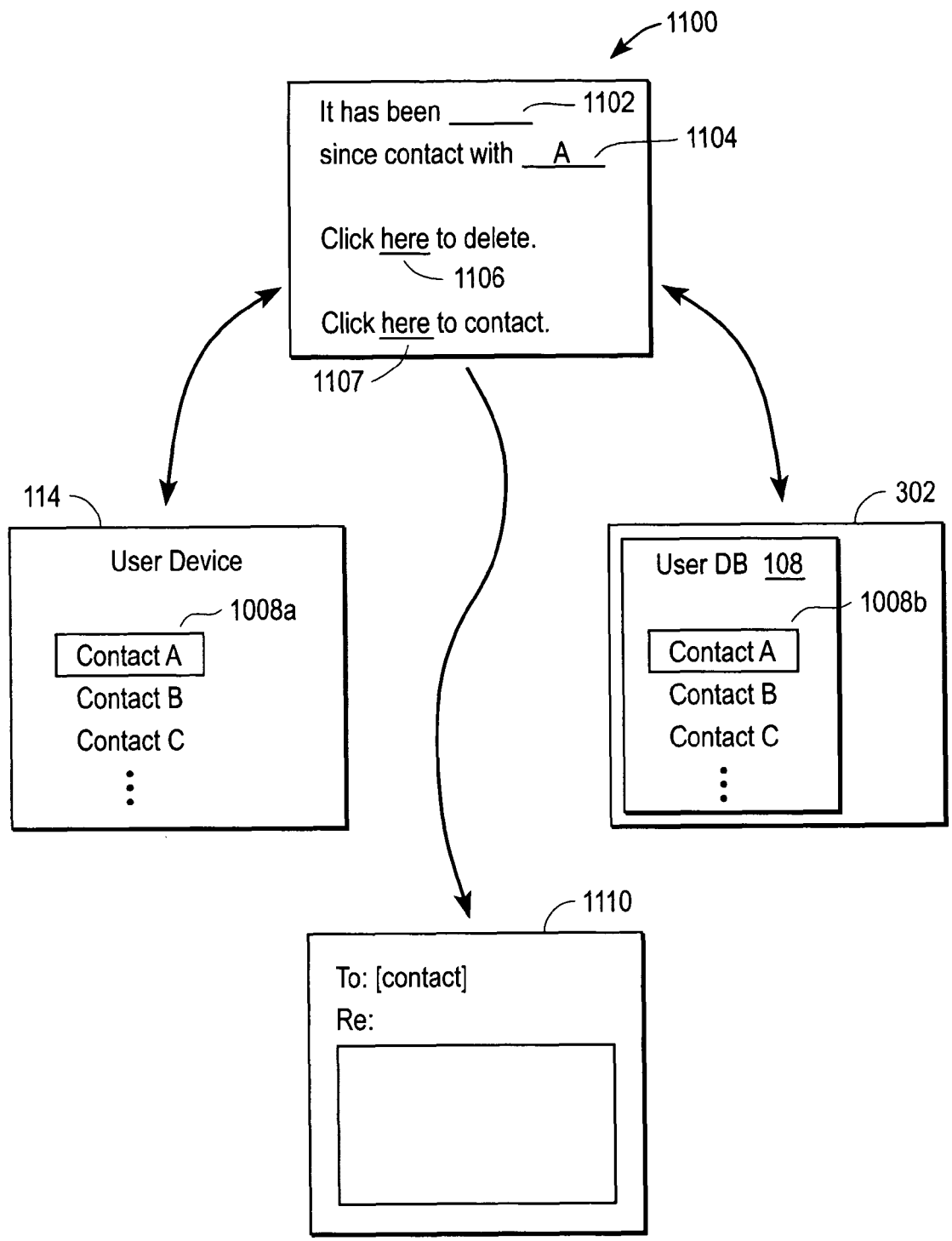
FIG. 11 is a diagram of an exemplary graphical user iternerface according to embodiments of the present invention.

More particularly, also shown in FIG. 11 is a contact list 1008a on the user device 114 and its corresponding contact list 1008b in the server user database 108. The contact list 1008b may be a list uploaded from the user device 114 via a browser and contact application 112 and thus should generally correspond with contact list 1008a.

In operation, as noted above, a contact timer 106 (FIG. 1) associated with, for example, contact A, may expire. In such a case, the message 1100 may be generated and caused to be displayed at user device 114. As shown, the message 1100 includes fields 1102, 1104 for time and contact identification, respectively, as well as a hyperlink 1106 and/or a hyperlink 1107 to allow the user to "click" and effect the action defined.

Thus, the user may receive the message 1100, indicating that "It has been [amount of time] since contact with [user A]" and can be instructed to "Click here to delete." If the user clicks to delete, the contact A in contact list 1008a and contact list 1008b will be deleted. Alternatively, or in addition, the user can be instructed to "Click here to contact." If the user clicks, then a message window, such as message window 1110, representative of, for example, an e-mail window, may be caused to "pop up" and allow the user to contact the aged buddy. It is noted, of course, that other messaging applications could be provided as a contact option.

Figure 12:
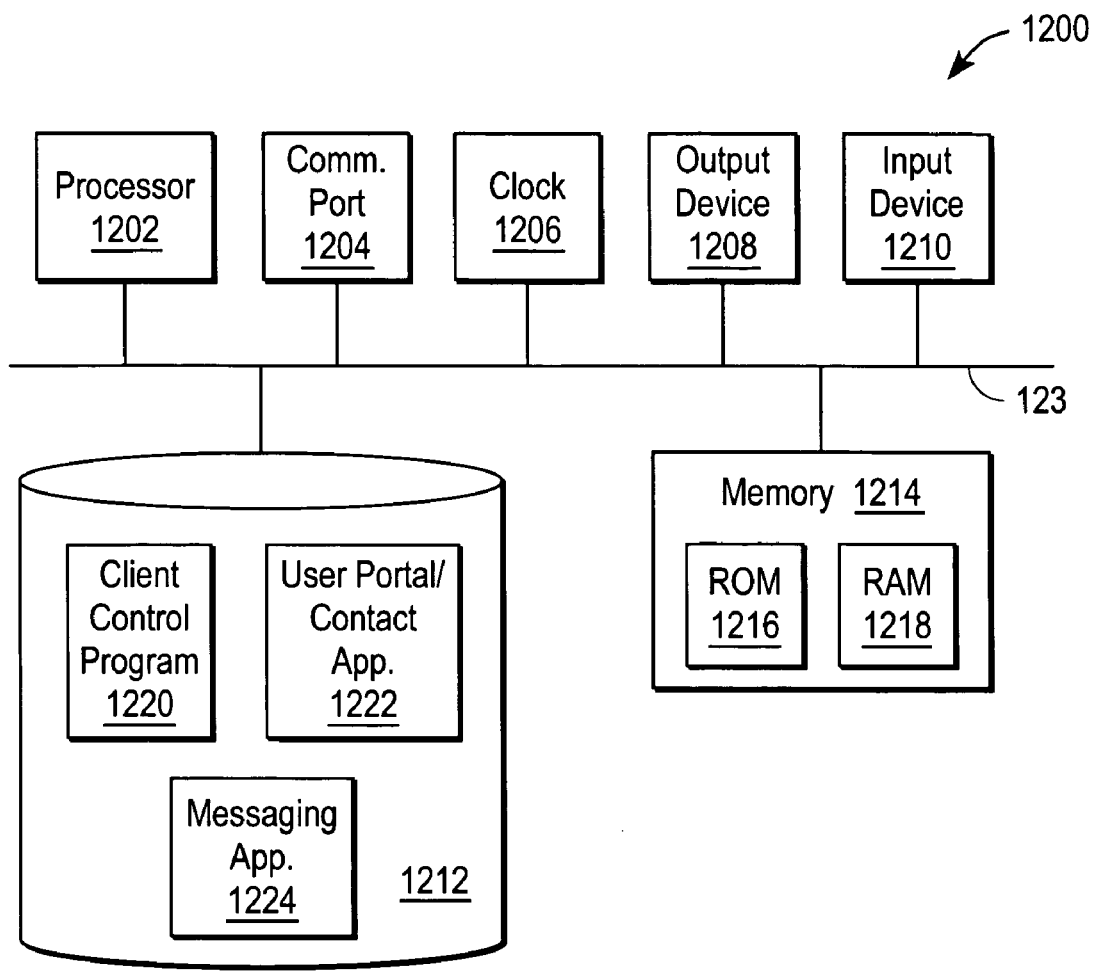
FIG. 12 is a block diagram of an exemplary user device according to embodiments of the present invention.

Now referring to FIG. 12, a representative block diagram of a computer or processing device 1200 suitable for use as a user device according to embodiments of the present invention is shown. In particular, the computer 1200 may be a device suitable for performing or accessing contact timing features in accordance with embodiments of the present invention. In some embodiments, the computer 1200 may include or operate a user portal/contact application 1222 including, e.g., a suitable web browser, and one or more messaging applications 1224, such as e-mail, telephony, Instant Messaging, SMS, and the like. The client control program 1220 may implement an operating system, such as Microsoft Windows. The computer 1200 may be embodied as a single device or computer, a networked set or group of devices or computers, a workstation, mainframe or host computer, etc. In some embodiments, the computer 1200 may implement one or more elements of the methods disclosed herein.

The computer 1200 may include a processor, microchip, central processing unit, or computer 1202 that is in communication with or otherwise uses or includes one or more communication ports or network interfaces 1204 for communicating with user devices and/or other devices. The communication ports 1204 may include such things as telephone adapters, local area network adapters, wireless communication devices, Bluetooth technology, etc. The computer 1200 also may include an internal clock element 1206 to maintain an accurate time and date for the computer 1200, create time stamps for communications received or sent by the computer 1200, etc.

If desired, the computer 1200 may include one or more output devices 1208 such as a printer, infrared or other transmitter, antenna, display screen or monitor, text to speech converter, speaker, etc., as well as one or more input devices 1210 such as a bar code reader or other optical scanner, infrared or other receiver, antenna, magnetic stripe reader, image scanner, roller ball, touch pad, joystick, touch screen, computer keyboard, computer mouse, microphone, etc.

In addition to the above, the computer 1200 may include a memory or data storage device 1212 to store information, software, databases, documents, communications, device drivers, etc. The memory or data storage device 1212 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. Thus, the storage device 1212 may include various combinations of moveable and fixed storage. The computer 1200 also may include memory 1214, such as ROM 1216 and RAM 1218.

The processor 1202 and the data storage device 1212 in the computer 1200 each may be, for example: (i) located entirely within a single computer or other computing device; or (ii) connected to each other by a remote communication medium, such as a serial port cable, telephone line or radio frequency transceiver. In one embodiment, the computer 1200 may be implemented as one or more computers that are connected to a remote server computer, as will be explained in greater detail below.

A conventional personal computer or workstation with sufficient memory and processing capability may be used as the computer 1200. The computer 1200 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 1202. Other suitable processors may be available from Motorola, Inc., AMD, or Sun Microsystems, Inc. The processor 1202 also may be embodied as one or more microprocessors, computers, computer systems, etc.

Software may be resident and operating or operational on the computer 1200. The software may be stored on the data storage device 1212 and may include a user portal and messaging application. It is noted that, while illustrated as software stored in storage medium 1212, the various control modules in accordance with embodiments of the present invention may also include related firmware and/or hardware components. Thus, the figure is exemplary only.

The client control program 1220, the user portal/contact application 1222, and the messaging application 1224 may control the processor 1202. The processor 1202 may perform instructions of the control programs and clients, and thereby operate in accordance with the methods described in detail herein. The control programs and clients may be stored in a compressed, uncompiled and/or encrypted format. The control programs and clients furthermore include program elements that may be necessary, such as an operating system, a database management system and device drivers for allowing the processor 1202 to interface with peripheral devices, databases, etc. Appropriate program elements are known to those skilled in the art, and need not be described in detail herein.

According to some embodiments, the instructions of the control program and clients may be read into a main memory from another computer-readable medium, such as from the ROM 1216 to the RAM 1218. Execution of sequences of the instructions in the control program causes the processor 1202 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 1202, communication ports 1204, clock 1206, output device 1208, input device 1212, data storage device 1212, ROM 1216 and RAM 1218 may communicate or be connected directly or indirectly in a variety of ways. For example, the processor 1202, communication ports 1204, clock 1206, output device 1208, input device 1212, data storage device 1212, ROM 1216 and RAM 1218 may be connected via a bus 123.

While specific implementations and hardware/software configurations for the computer 1200 have been illustrated, it should be noted that other implementations and hardware configurations are possible and that no specific implementation or hardware/software configuration is needed. Thus, not all of the components illustrated in FIG. 12 may be needed for the computer 1200 implementing the methods disclosed herein.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents.

What is claimed is:

1. A telecommunications method comprising:
   communications devices registering with a presence and availability service provided via a system, the communications devices being communicatively connected to the system, the communications devices comprising a first communications device and at least one other communications device;
   creating contact lists that are stored in a database accessible by the communications devices, each of the contact lists identifying a plurality of parties for communicating with those parties via a communication event, the communication event being one of: instant messaging, short messaging service (SMS) messaging, electronic messaging, telephone calling, and a meeting identified in a calendar event of a calendar maintained by a calendar service;
   a contact manager monitoring the contact lists and communication events involving the parties identified in the contact lists and the users associated with the contact lists;
   the contact manager causing a contact timer to activate after a first communication event takes places between a user of the first communications device and a contacted party, the contacted party being a party on the contact list associated with the user of the first communications device and the first communication event being one of short messaging service, (SMS) messaging, instant messaging, electronic messaging, telephone calling, and a meeting identified in a calendar event of a calendar for the user maintained by the calendar service;
   if the contact timer reaches a predetermined threshold before the user of the first communications device has a second communication event with the contacted party after the first communication event ended, sending a message to the first communications device having a notification, the notification asking the user of the first communications device to actuate a link to delete the contacted party from the contact list of the first communications device or to actuate a link to initiate the second communication event with the contacted party, the second communication event being one of: SMS messaging, electronic messaging, telephone calling, instant messaging, and a meeting identified in a calendar event of the calendar; and
   if the second communication event occurs before the contact timer reaches the predetermined threshold, actuating the contact timer to restart counting after the second communication event ends.

2. The method of claim 1 wherein the predetermined threshold is a time that identifies an age that is an amount of time since a user of the first communications device has had a communication event with the contacted party.

3. The method of claim 2 further comprising the user of the first communications device sending a message to the contact manager via the first communications device to identify a communication event so that the contact timer is restarted, and wherein the first communications device is a telephony handset, a personal computer, a cellular telephone, a telephone, a computer or a personal digital assistant.

4. The method of claim 1 wherein the communications devices are at least one of: telephony handsets, personal computers, cellular telephones, telephones, and computers.

5. The method of claim 1 wherein the user of the first communications device selects contacts of the contact list associated with the user of the first communications device that the contact manager monitors.

6. The method of claim 1 wherein the contact manager sends the message having a notification to the first communications device.

7. The method of claim 1 wherein the notification asks the user of the first communications device to actuate the link to delete the contacted party from the contact list of the first communications device and also asks the user to actuate the link to initiate the second communication event with the contacted party, the second communication event being one of: SMS messaging, electronic messaging, telephone calls, instant messaging, and meetings identified in a calendar event of the calendar.

8. The method of claim 1 further comprising the user of the first communications device setting the predetermined threshold.

9. The method of claim 1 wherein the contact manager monitors the first communications device to determine whether the contacted party has been communicated with via SMS messaging, electronic messaging, a telephone call, or a meeting listed in a calendar event of the calendar.

10. The method of claim 1 wherein the first communications event and the second communications event are different meetings identified in calendar events of the calendar.

11. A telecommunications system comprising:
   a plurality of communications devices, the communications devices comprising a first communications device and other communications devices;
   a presence and availability service, the communication devices connectable to the presence and availability service and registered with the presence and availability service;
   a contact manager, the contact manager communicatively connected to the presence availability service and communicatively connectable to the communication devices;
   a plurality of contact lists stored in a database accessible by the communication devices, the presence and availability service and the contact manager, each of the contact lists being associated with a respective user of a respective one of the communication devices, each of the contact lists identifying a plurality of parties for communicating with those parties via a communication event;
   the contact manager monitoring the contact lists and communication events involving the parties identified in the contact lists and the users associated with the contact lists;
   the contact manager causing a contact timer to activate after a first communication event takes places between a user of the first communications device and a contacted party, the contacted party being a party on the contact list associated with the user of the first communications device and the first communication event being one of short messaging service, (SMS) messaging, instant messaging, electronic messaging, telephone calling, and a meeting identified in a calendar event of a calendar for the user maintained by a calendar service;
   if the contact timer reaches a predetermined threshold before the user of the first communications device has a second communication event with the contacted party after the first communication event ended, a message being sent to the first communications device having a notification, the notification asking the user of the first communications device to actuate a link to delete the contacted party from the contact list of the first communications device or to actuate a link to initiate the second communication event with the contacted party, the second communication event being one of: SMS messaging, electronic messaging, telephone calling, instant messaging, and a meeting identified in a calendar event of the calendar; and
   if the second communication event occurs before the contact timer reaches the predetermined threshold, the contact timer being actuated to restart counting after the second communication event ends.

12. The system of claim 11 wherein the predetermined threshold is a time that identifies an age that is an amount of time since the user of the first communications device has had a communication event with the contacted party.

13. The system of claim 11 further comprising the user of the first communications device sending a message to the contact manager via the first communications device to identify a communication event so that the contact timer is restarted, and wherein the first communications device is a telephony handset, a personal computer, a cellular telephone, a telephone, a computer or a personal digital assistant.

14. The system of claim 11 wherein the communications devices are at least one of: telephony handsets, personal computers, cellular telephones, telephones, and computers.

15. The system of claim 11 wherein the user of the first communications device selects contacts of the contact list associated with the user of the first communications device that the contact manager monitors.

16. The system of claim 11 wherein the contact manager sends the message having a notification to the first communications device.

17. The system of claim 11 wherein the first communications event and the second communications event are different meetings identified in calendar events of the calendar.

18. The system of claim 11 wherein the user of the first communications device sets the predetermined threshold.

19. The system of claim 11 wherein the contact manager monitors the first communications device to determine whether the contacted party has been communicated with via SMS messaging, electronic messaging, a telephone call, or a meeting listed in a calendar event of the calendar.

20. The system of claim 11 wherein the notification asks the user of the first communications device to actuate the link to delete the contacted party from the contact list of the first communications device and also asks the user to actuate the link to initiate the second communication event with the contacted party, the second communication event being one of: SMS messaging, electronic messaging, telephone calling, instant messaging, and a meeting identified in a calendar event of the calendar.

* * * * *